United States Patent
Legros et al.

(10) Patent No.: US 8,878,409 B2
(45) Date of Patent: Nov. 4, 2014

(54) CONTAINMENT BAND FOR PERMANENT MAGNET GENERATOR

(75) Inventors: Craig R. Legros, Rockford, IL (US); Roy D. Rasmussen, Janesville, WI (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 176 days.

(21) Appl. No.: 13/614,191

(22) Filed: Sep. 13, 2012

(65) Prior Publication Data

US 2014/0070634 A1 Mar. 13, 2014

(51) Int. Cl.
*H02K 1/28* (2006.01)

(52) U.S. Cl.
CPC .................................. *H02K 1/28* (2013.01)
USPC ................................................... 310/156.31

(58) Field of Classification Search
USPC .................................................... 310/156.31
See application file for complete search history.

(56) References Cited

U.S. PATENT DOCUMENTS

| | | | |
|---|---|---|---|
| 3,958,140 A | | 5/1976 | Horgan |
| 4,564,777 A | * | 1/1986 | Senoo et al. ............. 310/156.81 |
| 6,628,022 B2 | | 9/2003 | Clayton et al. |
| 7,075,204 B2 | * | 7/2006 | Shiao et al. .............. 310/156.22 |
| 7,908,862 B2 | | 3/2011 | Hannah |
| 7,964,492 B2 | | 6/2011 | Ikeda et al. |
| 8,026,647 B2 | | 9/2011 | Seo |
| 8,134,331 B2 | | 3/2012 | Rozman et al. |
| 8,162,762 B2 | | 4/2012 | Himmelmann |
| 8,198,742 B2 | | 6/2012 | Jorgensen et al. |
| 8,201,317 B2 | | 6/2012 | Ganong et al. |
| 8,237,298 B2 | | 8/2012 | Lemmers, Jr. |
| 2009/0160281 A1 | * | 6/2009 | Rasmussen et al. ..... 310/156.12 |

* cited by examiner

*Primary Examiner* — Tran Nguyen
(74) *Attorney, Agent, or Firm* — Carlson, Gaskey & Olds, PC

(57) ABSTRACT

A rotor has a rotor body for rotation about a shaft. A plurality of permanent magnets are spaced circumferentially about the rotor body. A containment band is positioned radially outwardly of the permanent magnets. The containment band has a containment band coefficient of thermal expansion. The permanent magnets have a permanent magnet coefficient of thermal expansion, taken parallel to a magnetic alignment. A ratio of the containment band coefficient of thermal expansion to the permanent magnet coefficient of thermal expansion is less than or equal to 1.15.

14 Claims, 1 Drawing Sheet

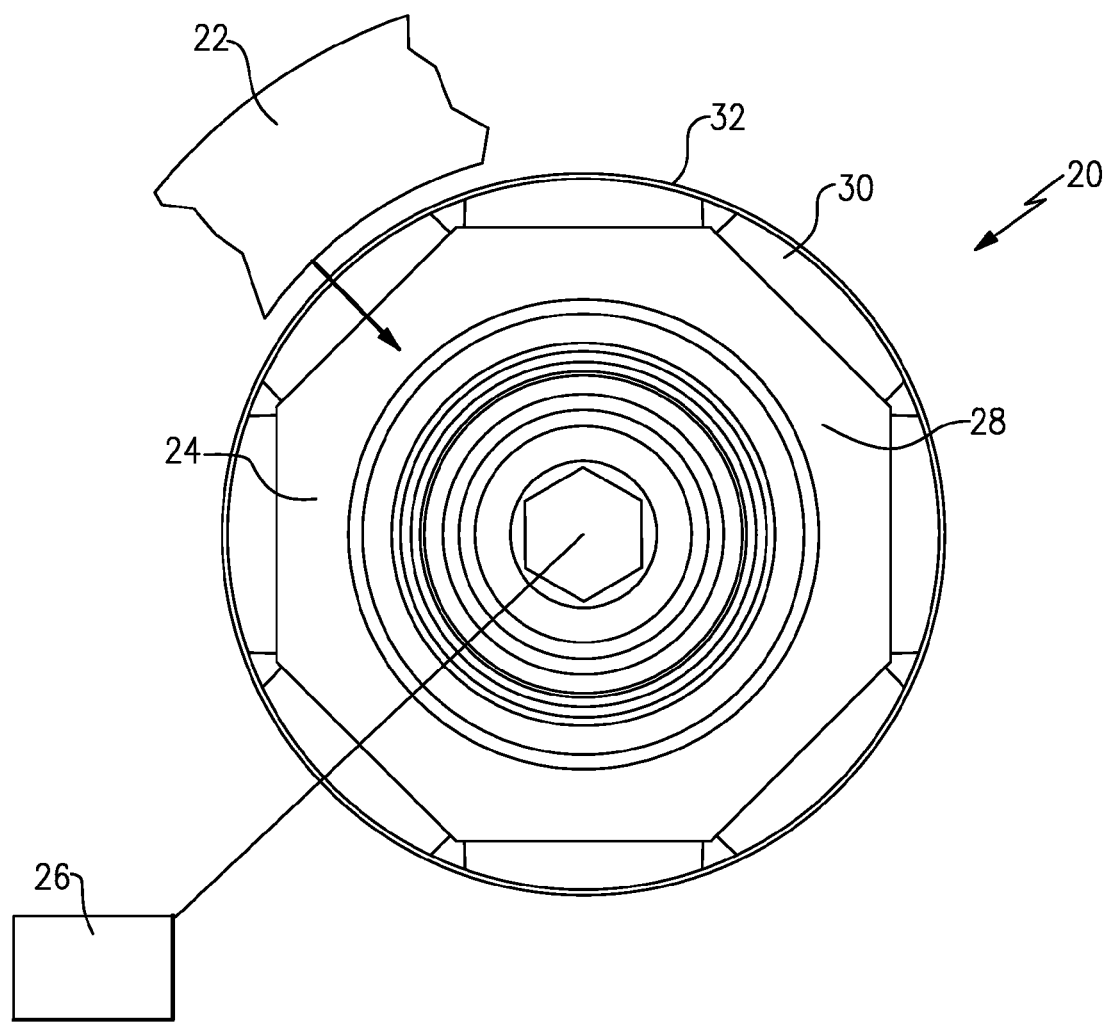

CONTAINMENT BAND FOR PERMANENT MAGNET GENERATOR

BACKGROUND OF THE INVENTION

This application relates to a generator containment band having a coefficient of thermal expansion that is close to the coefficient of thermal expansion of the associated permanent magnets.

Generators are known, and typically include a source of drive driving a generator rotor. The generator rotor rotates in close proximity to a stator, and electricity is generated in the stator as the rotor rotates.

One type of rotor carries permanent magnets, and the rotation of these permanent magnets adjacent to windings in the stator create a magnetic flux that generates the electricity. It is desirable to have the magnetic flux be utilized as efficiently in the generation of electricity as is practical. Thus, components which may be mechanically necessary desirably do not limit the efficiency of the generation of electricity.

One type of rotor includes a containment band positioned radially outwardly of the permanent magnets, and which serves to hold the magnets onto the rotor. In the past, containment bands have desirably been thin, as they might otherwise reduce the efficiency of the flux interaction with the windings on the stator. On the other hand, the containment band must be strong enough to hold the permanent magnets, even against the high stresses that are encountered by high speed generator rotors.

Thus, very high strength materials have been utilized for the containment band, which has been unduly expensive.

SUMMARY OF THE INVENTION

A generator rotor has a rotor body for rotation about a shaft. A plurality of permanent magnets are spaced circumferentially about the rotor body. A containment band is positioned radially outwardly of the permanent magnets. The containment band has a containment band coefficient of thermal expansion. The permanent magnets have a permanent magnet coefficient of thermal expansion, taken parallel to a magnetic alignment. A ratio of the containment band coefficient of thermal expansion to the permanent magnet coefficient of thermal expansion is less than or equal to 1.15. A generator is also disclosed.

These and other features of the invention may be best understood from the following specification and drawings, the following of which is a brief description.

BRIEF DESCRIPTION OF THE DRAWINGS

FIG. 1 schematically shows a generator.

DETAILED DESCRIPTION

FIG. 1 schematically shows a generator 20 incorporating a stator 22 which includes coils for the generation of electricity. A rotor 24 rotates adjacent to the stator 22. The rotor is a permanent magnet rotor and includes a rotor body 28, and permanent magnets 30 spaced circumferentially about an axis of rotation. The rotor 24 is driven about a central axis by a source of rotation 26, which may be a gas turbine engine. The structure of FIG. 1 is shown schematically, and any number of other controls and associated components are typically included on an actual generator.

A containment band 32 surrounds the permanent magnets, and serves to hold them for rotation with the rotor 24.

The containment band 32 preferably has a relatively thin thickness t. In embodiments, the containment band 32 may be between 0.015 and 0.040 inch (0.038 cm-0.102 cm) thick. These thicknesses are in a rotor having a nominal diameter D of between 1.0 and 4.0 inches (2.54 cm-10.16 cm). In embodiments, a ratio of t to D is between 0.00375 and 0.040. These sizes are particularly focused on generators operating at speeds between 12,000 and 30,000 RPM. On the other hand, the containment band has application in lower speed generators (e.g., 5,400 or 6,000 RPM), and may have application in high speed generators.

In the prior art, a coefficient of thermal expansion of the materials utilized for the containment band has been relatively high compared to a coefficient of thermal expansion for the materials utilized for the permanent magnets 30.

As an example, one common material utilized for the containment band is available as Inconel 718®. Inconel is a registered trademark of Special Metals Corporation. This material has a coefficient of thermal expansion of $7.34 \times 10^{-6}$ in/in ° F. across a temperature range of 70-350° F.

Another material is known as MP35N, and is available from Latrobe Specialty Steels. The coefficient of thermal expansion of this material is $7.5 \times 10^{-6}$ in/in ° F. across a temperature range of 70-350° F.

One common material utilized for the permanent magnets is available from Arnold Magnetics Technologies Corporation under the product name Recoma™. This stands for rare earth cobalt magnets. One particular material is $Sm_2Co_{17}$, which is a sintered powder metal product. A coefficient of thermal expansion for this material is non-homogeneous and varies, dependent on the orientation to the magnetic material boundaries obtained during the sintering and magnetizing process. The magnetic alignment is radial. The coefficient of thermal expansion parallel to the magnetic alignment of the permanent magnet materials is $6.1 \times 10^{-6}$ in/in ° F. across a temperature range of 70-350° F.

Thus, comparing the prior art materials for the containment band, the Inconel had a coefficient of thermal expansion of approximately 120% of the coefficient of thermal expansion of the permanent magnet material. The MP35N had a coefficient of thermal expansion that was 123% of the coefficient of thermal expansion of the permanent magnets.

Applicant has recognized that the variation in reaction to thermal change by the containment band compared to the permanent magnet has required stronger material be utilized for the containment band, and this has proven expensive.

Applicant has also recognized that by selecting a material for the containment band that has a coefficient of thermal expansion that more closely matches the coefficient of thermal expansion of the permanent magnet material, a less expensive material may be utilized.

One material that has been utilized is 15-5 precipitation hardened stainless steel, which is available from any number of sources. This material has a coefficient of thermal expansion of $6.45 \times 10^6$ in/in ° F. across a temperature range of 70-350° F. Thus, the coefficient of thermal expansion is 106% of the coefficient of thermal expansion of the permanent magnet material parallel to the magnetic alignment.

It has been traditionally believed that magnetic material should be avoided in the gap between the permanent magnets and the stator. 15-5 precipitation hardened stainless steel is magnetic. Thus, a worker of ordinary skill in the art would point away from selecting this material. However, applicant has found that the shunting that would occur from the use of this material is very low, and at an acceptable level given the other benefits from the material.

In embodiments, a material is selected for the containment band wherein a ratio of the coefficient of thermal expansion of the material utilized to form the permanent magnets, and the coefficient of thermal expansion taken parallel to the magnetic alignment of the material utilized to form the permanent magnets 30 is less than or equal to 1.15, and also greater than or equal to 0.90.

More narrowly, the ratio is between 0.95 and 1.1.

While this application specifically discloses a generator, the teachings would extend to other electric machines, and in particular, a permanent magnet motor.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A rotor comprising:
a rotor body for rotation about a shaft;
a plurality of permanent magnets spaced circumferentially about said rotor body;
a containment band positioned radially outwardly of said permanent magnets, said containment band having a containment band coefficient of thermal expansion, and said permanent magnets having a permanent magnet coefficient of thermal expansion, taken parallel to a magnetic alignment, and a ratio of said containment band coefficient of thermal expansion to the permanent magnet coefficient of thermal expansion is between 0.9 and 1.15;
a thickness of said containment band taken in a radial direction, and a ratio of said thickness to a diameter of said rotor is between 0.00375 and 0.040, and said rotor for use in a machine operating at a speed range of between 12,000 and 30,000 RPM; and
said containment band material is a stainless steel.

2. The rotor as set forth in claim 1, wherein said ratio of said containment band coefficient of thermal expansion to the permanent magnet coefficient of thermal expansion is less than or equal to 1.1, and greater than or equal to 0.95.

3. The rotor as set forth in claim 1, wherein a magnetic material for said permanent magnet is a sintered powdered metal.

4. The rotor as set forth in claim 3, wherein said sintered powdered metal is a rare earth material including cobalt.

5. The rotor as set forth in claim 4, wherein said sintered powdered metal is $Sm_2Co_{17}$.

6. The rotor as set forth in claim 1, wherein said stainless steel is 15-5 precipitation hardened stainless steel.

7. A machine comprising:
a stator surrounding a rotor;
the rotor including a rotor body for rotation about a shaft, a plurality of permanent magnets spaced circumferentially about said rotor body;
a containment band positioned radially outwardly of said permanent magnets, said containment band having a containment band coefficient of thermal expansion, and said permanent magnets having a permanent magnet coefficient of thermal expansion, taken parallel to a magnetic alignment, and a ratio of said containment band coefficient of thermal expansion to the permanent magnet coefficient of thermal expansion is between 0.9 and 1.15;
a thickness of said containment band taken in a radial direction, and a ratio of said thickness to a diameter of said rotor is between 0.00375 and 0.040; and
said containment band material is a stainless steel.

8. The machine as set forth in claim 7, wherein said ratio of said containment band coefficient of thermal expansion to the permanent magnet coefficient of thermal expansion is less than or equal to 1.1, and greater than or equal to 0.95.

9. The machine as set forth in claim 7, wherein a thickness of said containment band taken in a radial direction, and a ratio of said thickness to a diameter of said rotor is between 0.00375 and 0.040.

10. The machine as set forth in claim 7, wherein said permanent magnets are formed of a sintered powdered metal.

11. The machine as set forth in claim 10, wherein said sintered powdered metal is a rare earth material including cobalt.

12. The machine as set forth in claim 11, wherein said sintered powdered metal is $Sm_2Co_{17}$.

13. The machine as set forth in claim 7, wherein said stainless steel is 15-5 precipitation hardened stainless steel.

14. The machine as set forth in claim 7, wherein said rotor operates across a speed range of between 12,000 and 30,000 RPM.

* * * * *